(12) United States Patent
Holder et al.

(10) Patent No.: US 11,639,851 B1
(45) Date of Patent: May 2, 2023

(54) LEVELING ROD ATTACHMENT

(71) Applicants: Kevin Holder, Cameron, NC (US); Aaron Robertson, Cameron, NC (US)

(72) Inventors: Kevin Holder, Cameron, NC (US); Aaron Robertson, Cameron, NC (US)

( * ) Notice: Subject to any disclaimer, the term of this patent is extended or adjusted under 35 U.S.C. 154(b) by 0 days.

(21) Appl. No.: 17/531,930

(22) Filed: Nov. 22, 2021

(51) Int. Cl.
*G01B 3/08* (2006.01)
*G01C 9/28* (2006.01)

(52) U.S. Cl.
CPC .......... *G01C 9/28* (2013.01); *G01B 3/08* (2013.01)

(58) Field of Classification Search
CPC .................................. G01C 9/28; G01B 3/08
USPC ................................................... 33/342, 809
See application file for complete search history.

(56) References Cited

U.S. PATENT DOCUMENTS

| | | | | |
|---|---|---|---|---|
| 2,356,544 A * | 8/1944 | Swanson | ................. | G01B 3/08 33/809 |
| 5,357,683 A * | 10/1994 | Trevino | ................. | B25H 7/00 33/528 |
| 5,507,101 A * | 4/1996 | Mason | ................. | B60S 5/00 33/760 |
| 6,101,730 A * | 8/2000 | Marino | ................. | E04F 21/0076 33/456 |
| 7,257,903 B2 | 8/2007 | Lee | | |
| 8,850,710 B1 | 10/2014 | Rodrigue et al. | | |
| 10,562,176 B2 * | 2/2020 | Illingworth | ................. | B25H 7/02 |
| 2021/0239468 A1 * | 8/2021 | Bunting | ................. | G01C 9/34 |
| 2022/0163326 A1 * | 5/2022 | Kirby | ................. | G01C 9/34 |

\* cited by examiner

*Primary Examiner* — George B Bennett
(74) *Attorney, Agent, or Firm* — Sanchelima & Associates, P.A.; Christian Sanchelima; Jesus Sanchelima

(57) ABSTRACT

A leveling rod attachment including a first telescopic assembly, a second telescopic assembly and a clamper assembly is disclosed herein. The first telescopic assembly includes vertical rods being slidably connected one to each other. Each of the vertical rods has measurement indicia. The second telescopic assembly includes horizontal rods being slidably connected one to each other. Each of the horizontal rods has measurement indicia. One of the horizontal rods has a bubble level mounted thereon. the clamper assembly includes a clamper and latches. The clamper is attached to the second telescopic assembly. The damper slidably mounts the second telescopic assembly to the first telescopic assembly. The latches secure length of the first telescopic assembly and length of the second telescopic assembly.

13 Claims, 5 Drawing Sheets

US 11,639,851 B1

LEVELING ROD ATTACHMENT

BACKGROUND OF THE INVENTION

1. Field of the Invention

The present invention relates to a leveling rod attachment and, more particularly, to a leveling rod attachment that includes a measuring rod being connected to a second rod with a bubble level.

2. Description of the Related Art

Several designs for a leveling rod attachment have been designed in the past. None of them, however, include a rod having a bubble level being slidably attached to a first rod, the first rod having measurement indicia.

Applicant believes that a related reference corresponds to U.S. Pat. No. 7,257,903 issued for a leveling rod with a stencil attachment. Applicant believes that another related reference corresponds to U.S. Pat. No. 8,850,710 issued for an interconnectable construction level system. None of these references, however, teach of a leveling rod attachment system that includes a first rod having measurement indicia and a slidable rod attached thereon to measure depths, wherein a telescopic rod having a bubble level slidably and perpendicularly attached to the first rod.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a leveling rod attachment having a telescopic rod having a bubble level mounted thereon to determine grading of a surface.

It is another object of this invention to provide a leveling rod attachment having a slidable rod having measurement indicia to measure depth of surfaces to calculate the amount of fill material if needed.

It is still another object of the present invention to provide a leveling rod attachment that allows a user to make cut and fill measurements easy and efficiently.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
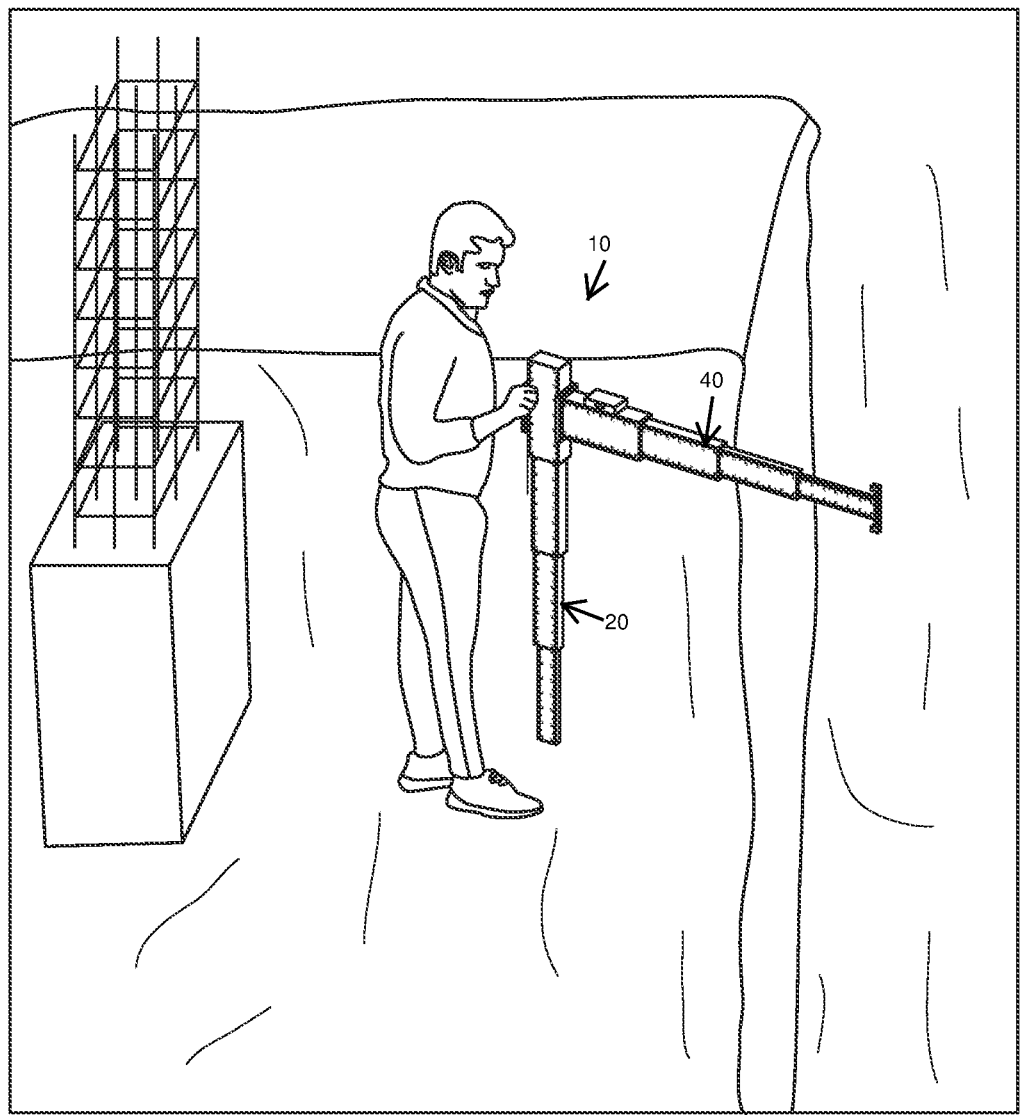
FIG. 1 represents an isometric operational view one of the preferred embodiments of the present invention 10 showing a user measuring depth with first telescopic assembly 20 and inclination with second telescopic assembly 40.

Referring now to the drawings, where the present invention is generally referred to with numeral 10, it can be observed that it basically includes a first telescopic assembly 20, a second telescopic assembly 40 and a clamper assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The first telescopic assembly 20 may include first vertical rod 22, second vertical rod 24, third vertical rod 26 and fourth vertical rod 28. First vertical rod 22, second vertical rod 24, third vertical rod 26 and fourth vertical rod 28 may have a rectangular elongated shape. Other embodiments of the first telescopic assembly 20 may include first vertical rod 22, second vertical rod 24, third vertical rod 26 and fourth vertical rod 28 having a cylindrical shape, a prismatic shape or any other shape. Preferably first vertical rod 22 may have bigger width than second vertical rod 24. Second vertical rod 24 may have bigger width than third vertical rod 26. Third vertical rod 26 may have bigger width than fourth vertical rod 28. First vertical rod 22, second vertical rod 24, third vertical rod 26 and fourth vertical rod 28 may have same length.

First vertical rod 22 may have first sidewalls 22a and 22b defining first slot channel 22c. First sidewalls 22a and 22b may have a rectangular shape. First sidewalls 22a and 22b may have other shapes like rounded shapes, triangular shapes, irregular shapes, or any other suitable shape. Second vertical rod 24 may have second sidewalls 24a and 24b defining second slot channel 24c. Second sidewalls 24a and 24b may have a rectangular shape. Second sidewalls 24a and 24b may have other shapes like rounded shapes, triangular shapes, irregular shapes, or any other suitable shape. Third vertical rod 26 may have third sidewalls 26a and 26b defining third slot channel 26c. Third sidewalls 26a and 26b may have a rectangular shape. Third sidewalls 26a and 26b may have other shapes like rounded shapes, triangular shapes, irregular shapes, or any other suitable shape. First slot channel 22c may have bigger width and depth than second slot channel 24c. Second slot channel 24c may have bigger width and depth than third slot channel 26c.

First slot channel 22c may slidably receive second vertical rod 24. Second slot channel 24c may slidably receive third vertical rod 26. Third slot channel 26c may slidably receive fourth vertical rod 28. First front face 22d of first vertical rod 22 may include measurement indicia thereon. Second front face 24d of second vertical rod 24 may include measurement indicia thereon. Third front face 26d of third vertical rod 26 may include measurement indicia thereon. Fourth front face 28d of fourth vertical rod 28 may include measurement indicia thereon. In one embodiment, first vertical rod 22, second vertical rod 24, third vertical rod 26 and fourth vertical rod 28 may have a length of 6 inches. First telescopic assembly 20 may have a variable length from 6 inches to 24 inches. It should be understood that first telescopic assembly 20 may have more or less vertical rods with different lengths. The first telescopic assembly 20 may be made of fiberglass, aluminum, wood, plastic, stainless steel or any other rigid material.

The second telescopic assembly 40 may include first horizontal rod 42, second horizontal rod 44, third horizontal rod 46 and fourth horizontal rod 48. First horizontal rod 42, second horizontal rod 44, third horizontal rod 46 and fourth horizontal rod 48 may have a rectangular elongated shape. Other embodiments of the second telescopic assembly 40 may include first horizontal rod 42, second horizontal rod 44, third horizontal rod 46 and fourth horizontal rod 48 having a cylindrical shape, a prismatic shape or any other shape. Preferably first horizontal rod 42 may have bigger width than second horizontal rod 44. Second horizontal rod 44 may have bigger width than third horizontal rod 46. Third horizontal rod 46 may have bigger width than fourth horizontal rod 48. First horizontal rod 42, second horizontal rod 44, third horizontal rod 46 and fourth horizontal rod 48 may have same length.

First horizontal rod 42 may have fifth sidewalls 42a and 42b defining fifth slot channel 42c. Fifth sidewalls 42a and 42b may have a rectangular shape. First sidewalls 42a and 42b may have other shapes like rounded shapes, triangular shapes, irregular shapes, or any other suitable shape. Second horizontal rod 44 may have sixth sidewalls 44a and 44b defining sixth slot channel 44c. Sixth sidewalls 44a and 44b may have a rectangular shape. Sixth sidewalls 44a and 44b may have other shapes like rounded shapes, triangular shapes, irregular shapes, or any other suitable shape. Third horizontal rod 46 may have seventh sidewalls 46a and 46b defining seventh slot channel 46c. seventh sidewalls 46a and 46b may have a rectangular shape. Seventh sidewalls 46a and 46b may have other shapes like rounded shapes, triangular shapes, irregular shapes, or any other suitable shape. Fifth slot channel 42c may have bigger width and depth than six slot channel 44c. Six slot channel 44c may have bigger width and depth than seventh slot channel 46c.

Fifth slot channel 42c may slidably receive second horizontal rod 44. Six slot channel 44c may slidably receive third horizontal rod 46. Seventh channel 46c may slidably receive fourth horizontal rod 48. Fifth front face 42d of first horizontal rod 42 may include measurement indicia thereon. Six front face 44d of second horizontal rod 44 may include measurement indicia thereon. Seventh front face 46d of third horizontal rod 46 may include measurement indicia thereon. Eight front face 48d of fourth horizontal rod 48 may include measurement indicia thereon. In one embodiment, first horizontal rod 42, second horizontal rod 44, third horizontal rod 46 and fourth horizontal rod 48 may have a length of 6 inches. Second telescopic assembly 40 may have a variable length from 6 inches to 24 inches. It should be understood that second telescopic assembly 40 may have more or less vertical rods with different lengths. First horizontal rod 42 may include at least one spirit level 41 to determine grading of inclination of a surface. The at least one spirit level 41 may be any kind of bubble level known in the prior art. The at least one spirit level 41 may be attached to a top side of the first horizontal rod 42 via welding, bolts, rivets or the like. The at least one spirit level 41 may be parallel to first horizontal rod 42. A distal end of the fourth horizontal rod 48 may include a clip 43 to secure the second telescopic assembly 40 to a surface when measuring. Clip 43 have a vertical bar having horizontal bars at each end. The second telescopic assembly 40 may be made of wood, stainless steel, plastic, aluminum, fiberglass or the like.

Clamper assembly 60 includes a clamper 62, a first bolt 64 and a second bolt 66. Clamper 62 may have rear wall 62a and clamper sidewalls 62b defining a clamper slot channel 65. In a preferred embodiment, rear wall 62a and clamper sidewalls 62b may have rectangular shape. Rear wall 62a and clamper sidewalls 62b may have any other shape. Rear wall 62a may have an opening 62c having a circular shape or any other shape. One of clamper sidewalls 62b may be attached to one end of the first horizontal rod 42 via welding, rivets, bolts or the like. Clamper slot channel 65 may slidably receive first vertical rod 22. First bolt 64 and second bold 66 may secure a length of first telescopic assembly 20. First telescopic assembly 20 may be perpendicular to second telescopic assembly 40.

Figure 2:
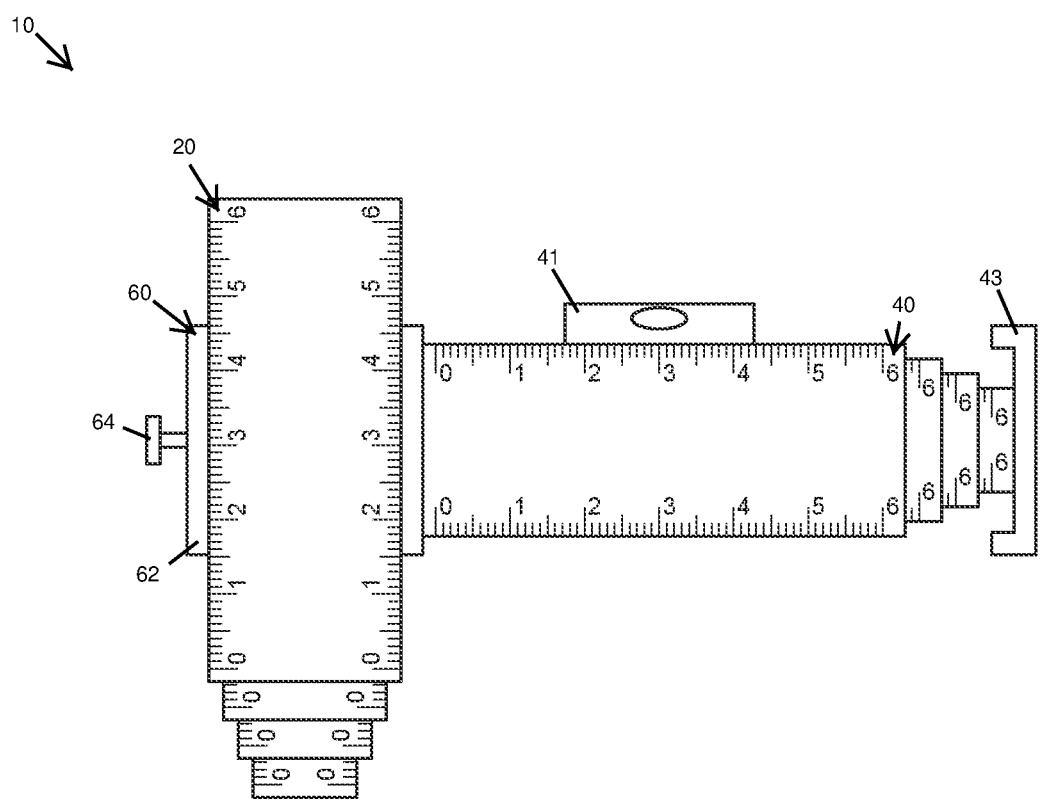
FIG. 2 shows a front view of the present invention 10 showing first telescopic assembly 20 and second telescopic assembly 40 in a retracted configuration.
Figure 3:
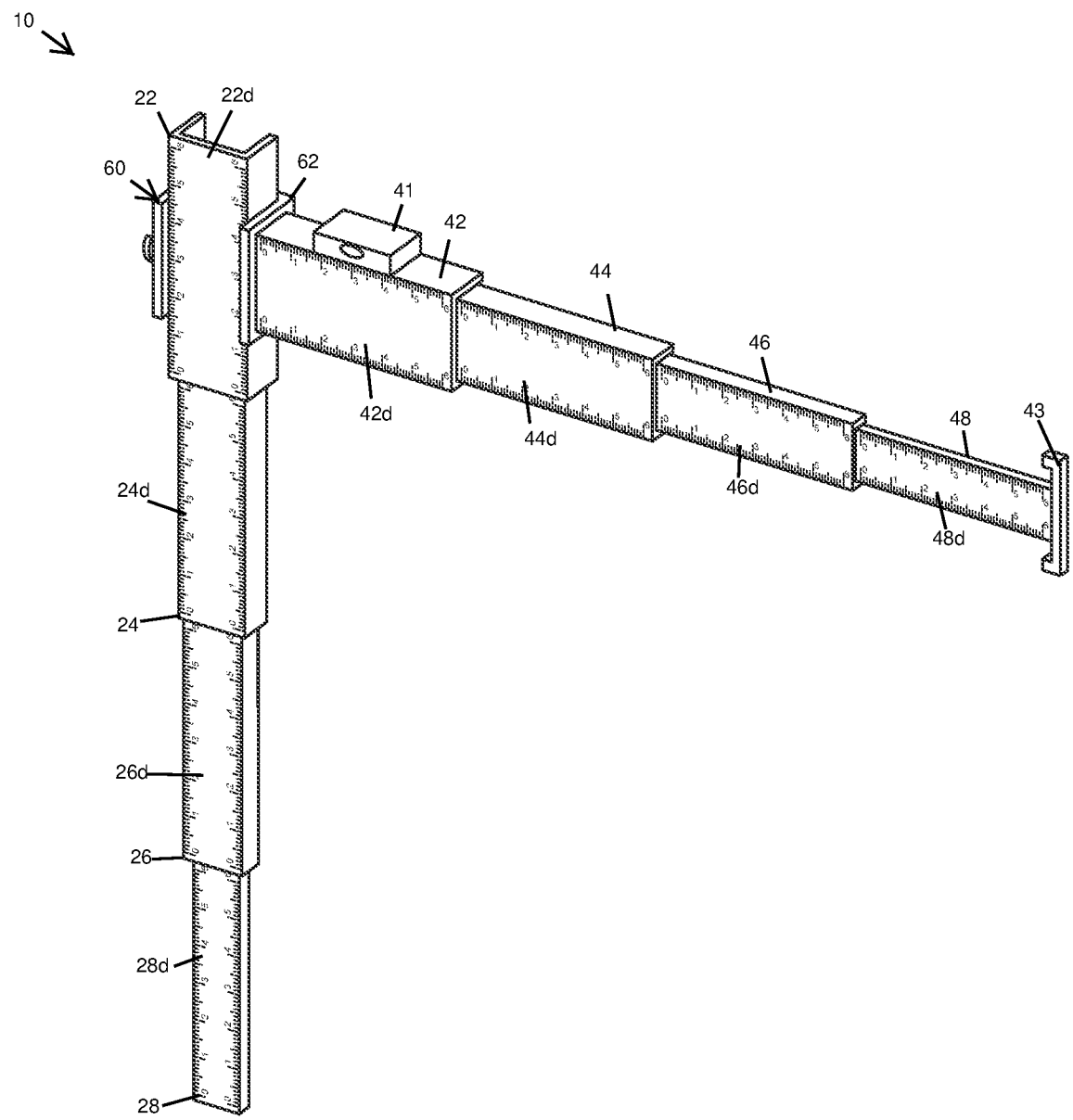
FIG. 3 illustrates an isometric view of the present invention 10 in an expanded configuration.
Figure 4:
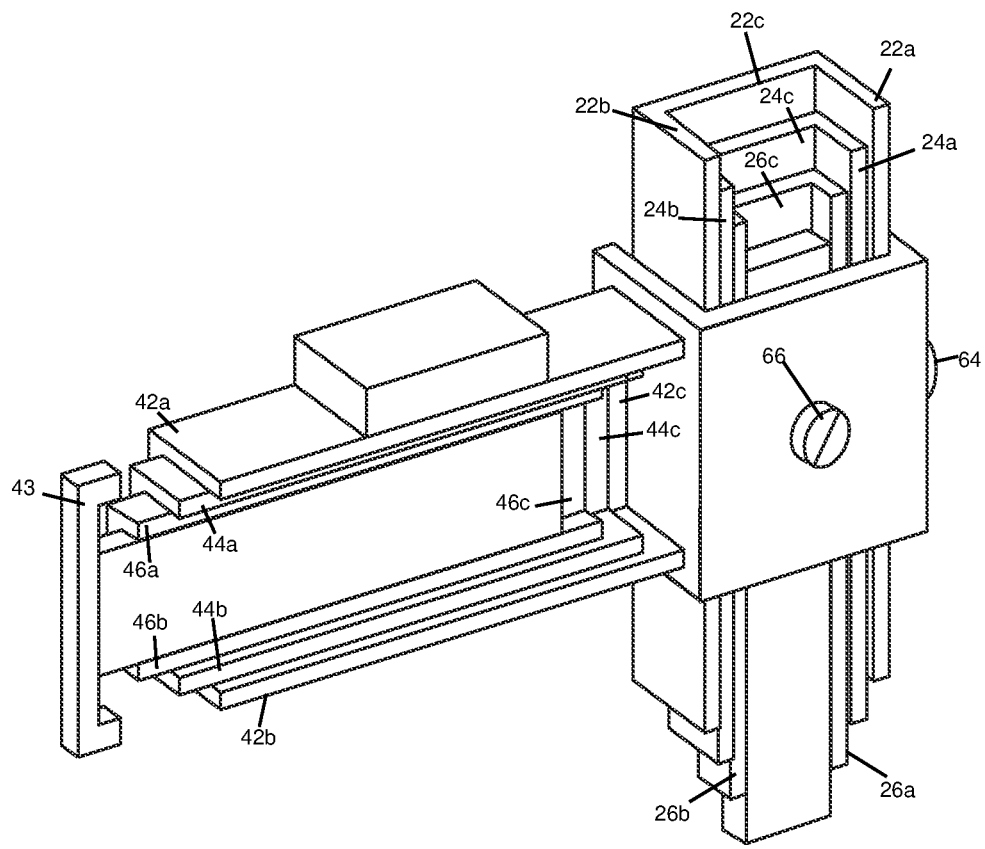
FIG. 4 illustrates an isometric rear view of the present invention 10 showing first slot channel 22c, second slot channel 24c, third slot channel 26c fifth slot channel 42c, sixth slot channel 44c and seventh slot channel 46c.
Figure 5:
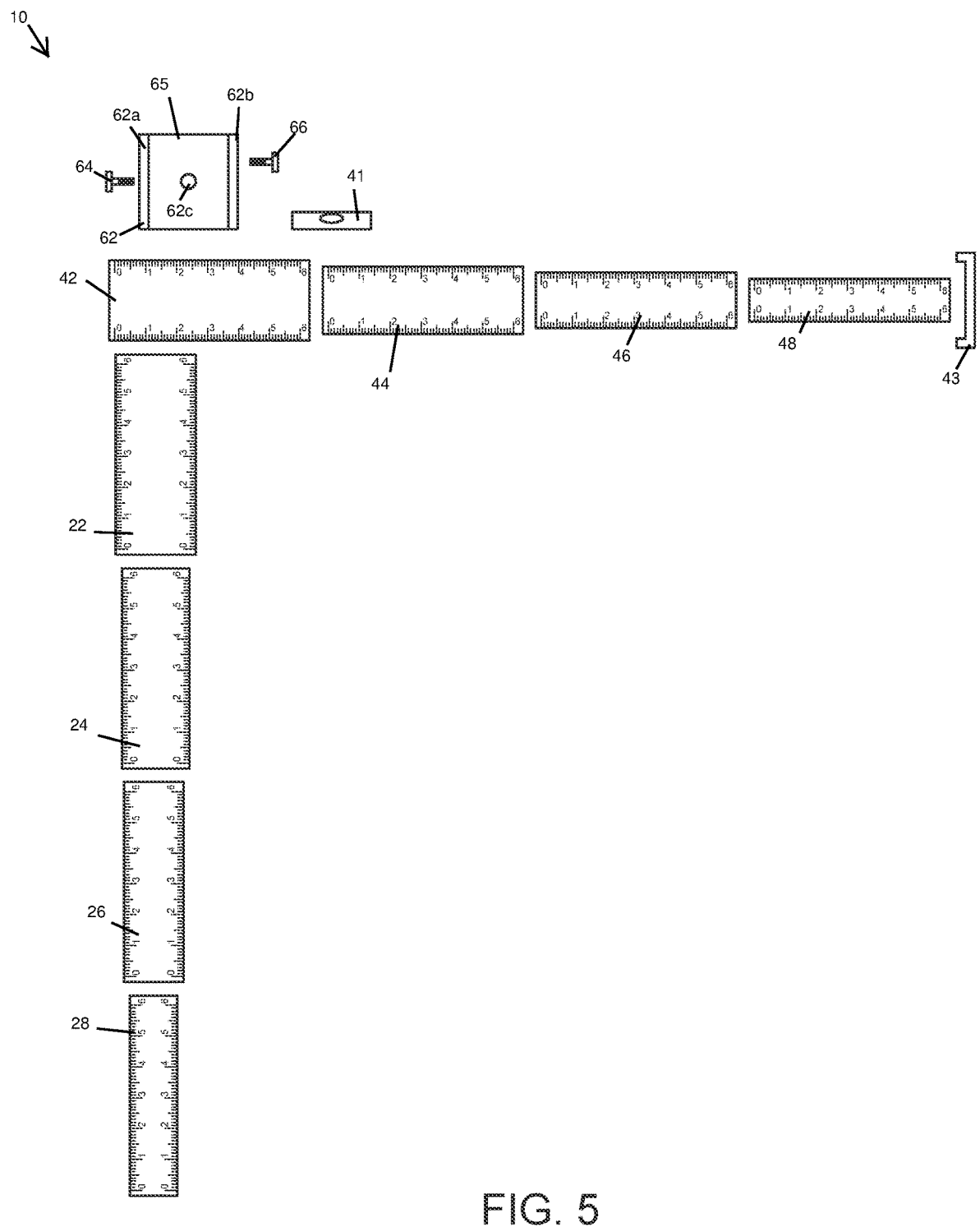
FIG. 5 is a representation of an exploded view of the present invention.

Referring now to FIG. 1, a user may expand as much as needed first telescopic assembly 20 and second telescopic assembly 40 to measure depth and width as needed. Measurement indicia of first telescopic assembly 20 and second telescopic assembly 40 may include multiple measurement unites such as feet, inches, yards, meters, centimeters, millimeters or the like to facilitate the measuring without unit conversions and with a single person doing the measurements. As shown in FIG. 2 and FIG. 4, the first telescopic assembly 20 and the second telescopic assembly 40 may be retracted for easy storing.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A leveling rod attachment, comprising:
   A) a first telescopic assembly including a first plurality of rods, wherein each rod of the first plurality of rods has measurement indicia, each rod of the first plurality of rods slidably receiving another rod of the first plurality of rods;
   B) a second telescopic assembly including a second plurality of rods, each rod of the second plurality of rods has measurement indicia, each rod of the second plurality of rods slidably receiving another rod of the second plurality of rods, one rod of the second plurality of rods includes a bubble level mounted thereon; and
   C) a clamper assembly including a clamper and two latches, the clamper is attached to the second telescopic assembly, the clamper slidably mounts the second telescopic assembly to the first telescopic assembly, one of the two latches secures a length of the first telescopic assembly, another of the two latches secures a length of the second telescopic assembly.

2. The leveling rod attachment of claim 1, wherein each rod of the first plurality of rods has a rectangular shape and a front face having the measurement indicia.

3. The leveling rod attachment of claim 1, wherein the first plurality of rods includes a first vertical rod, a second vertical rod, a third vertical rod and a fourth vertical rod.

4. The leveling rod attachment of claim 1, wherein each rod of the second plurality of rods has a rectangular shape and a front face with the measurement indicia.

5. The leveling rod attachment of claim 1, wherein the second plurality of rods includes a first horizontal rod, a second horizontal rod, a third horizontal rod and a fourth horizontal rod.

6. The leveling rod attachment of claim 3, wherein said first vertical rod includes a first slot channel to slidably receive said second vertical rod, wherein said second vertical rod includes a second slot channel to slidably receive said third vertical rod, wherein said third vertical rod includes a third slot channel to slidably receive said fourth vertical rod.

7. The leveling rod attachment of claim 5, wherein said first horizontal rod includes a fifth slot channel to slidably receive said second horizontal rod, wherein said second horizontal rod includes a sixth slot channel to slidably receive said third horizontal rod, wherein said third horizontal rod includes a seventh slot channel to slidably receive said fourth horizontal rod.

8. The leveling rod attachment of claim 5, wherein said fourth horizontal rod includes a distal end having a clip thereon.

9. The leveling rod attachment of claim 1, wherein said first telescopic assembly and said second telescopic assembly are made of aluminum.

10. The leveling rod attachment of claim 1, wherein each rod of the first plurality of rods has a length of 6 inches.

11. The leveling rod attachment of claim 1, wherein each rod of the second plurality of rods has a length of 6 inches.

12. A leveling rod attachment, comprising:
A) a first telescopic assembly including a first plurality of rods, wherein each rod of the first plurality of rods has a rectangular shape with a front face having measurement indicia, each rod of the first plurality of rods slidably receiving another rod of the first plurality of rods, each rod of the first plurality of rods has a length of 6 inches;
B) a second telescopic assembly including a second plurality of rods, wherein each rod of the second plurality of rods has a rectangular shape and a front face with measurement indicia, each rod of the second plurality of rods slidably receiving another rod of the second plurality of rods, one rod of the second plurality of rods includes a bubble level mounted thereon, another rod of the second plurality of rods includes a distal end having a clip coupled thereon, each rod of the second plurality of rods has a length of 6 inches; and
C) a clamper assembly including a clamper and two latches, the clamper is attached to the second telescopic assembly, the clamper slidably mounts the second telescopic assembly to the first telescopic assembly, one of the two latches secures a length of the first telescopic assembly, another of the two latches secures a length of the second telescopic assembly.

13. A leveling rod attachment, consisting of:
A) a first telescopic assembly including a first vertical rod, a second vertical rod, a third vertical rod and a fourth vertical rod, wherein the first vertical rod includes a first slot channel to slidably receive the second vertical rod, wherein the second vertical rod includes a second slot channel to slidably receive the third vertical rod, wherein the third vertical rod includes a third slot channel to slidably receive the fourth vertical rod, wherein said first vertical rod has a rectangular shape and a front face with measurement indicia thereon, the second vertical rod has a rectangular shape and a front face with measurement indicia thereon, the third vertical rod has a rectangular shape and a front face with measurement indicia thereon, the fourth vertical rod has a rectangular shape and a front face with measurement indicia thereon, the first vertical rod has a length of 6 inches, the second vertical rod has a length of 6 inches, the third vertical rod has a length of 6 inches, the fourth vertical rod has a length of 6 inches;
B) a second telescopic assembly including a first horizontal rod, a second horizontal rod, a third horizontal rod and a fourth horizontal rod, wherein the first horizontal rod includes a fifth slot channel to slidably receive the second horizontal rod, wherein the second horizontal rod includes a sixth slot channel to slidably receive the third horizontal rod, wherein the third horizontal rod includes a seventh slot channel to slidably receive the fourth horizontal rod, wherein said first horizontal rod has a rectangular shape and a front face with measurement indicia thereon, the second horizontal rod has a rectangular shape and a front face with measurement indicia thereon, the third horizontal rod has a rectangular shape and a front face with measurement indicia thereon, the fourth horizontal rod has a rectangular shape and a front face with measurement indicia thereon, the first horizontal rod has a length of 6 inches, the second horizontal rod has a length of 6 inches, the third horizontal rod has a length of 6 inches, the fourth horizontal rod has a length of 6 inches, the fourth horizontal rod includes a distal end having a clip attached thereon, the first horizontal rod includes a bubble level mounted thereon; and
C) a clamper assembly including a clamper and two latches, the clamper is attached to the second telescopic assembly, the clamper slidably mounts the second telescopic assembly to the first telescopic assembly, one of the two latches secures a length of the first telescopic assembly, another of the two latches secures a length of the second telescopic assembly.

* * * * *